United States Patent [19]

Seal et al.

[11] Patent Number: 5,403,537
[45] Date of Patent: Apr. 4, 1995

[54] METHOD FOR FORMING COMPOSITE STRUCTURES

[75] Inventors: Ellis C. Seal, Bay St. Louis, Miss.; Michael G. Ferrell; Venu P. Bodepudi, both of New Orleans, La.; Robert W. Biggs, Jr., Slidell, La.

[73] Assignee: Martin Marietta Corporation, Bethesda, Md.

[21] Appl. No.: 121,354

[22] Filed: Sep. 14, 1993

[51] Int. Cl.⁶ ............................................. B29C 43/56
[52] U.S. Cl. ...................... 264/511; 156/245; 156/286; 264/571; 264/102; 264/258; 264/316; 264/DIG. 78
[58] Field of Search ............ 264/101, 102, 510, 257, 264/DIG. 50, DIG. 78, 258, 511, 316, 571; 156/245, 286

[56] References Cited

U.S. PATENT DOCUMENTS

| | | | |
|---|---|---|---|
| 2,478,439 | 8/1949 | Von Liedtke . | |
| 2,841,823 | 7/1958 | Van Hartesveldt | 264/DIG. 50 |
| 2,876,492 | 3/1959 | Frieder et al. | 264/DIG. 78 |
| 2,913,036 | 11/1959 | Smith | 264/DIG. 78 |
| 3,096,194 | 7/1963 | Klimann . | |
| 3,348,989 | 10/1967 | Roberts | 156/285 |
| 3,533,834 | 10/1970 | Marzocchi . | |
| 4,201,823 | 5/1980 | Russell | 264/101 |
| 4,313,972 | 2/1982 | Goller et al. . | |
| 4,318,963 | 3/1982 | Smith | 428/537 |
| 4,359,437 | 11/1982 | le Comte | 264/DIG. 78 |
| 4,548,859 | 10/1985 | Kline et al. | 428/251 |
| 4,588,615 | 5/1986 | Otty . | |
| 4,692,199 | 9/1987 | Kozlowski et al. | 264/511 |
| 4,767,643 | 8/1988 | Westervelt et al. . | |
| 4,882,118 | 11/1988 | Megarry | 264/258 |
| 5,000,902 | 3/1991 | Adams | 264/510 |
| 5,114,637 | 5/1992 | Williams et al. | 264/DIG. 78 |
| 5,122,323 | 6/1992 | Sullivan, Sr. | 264/511 |
| 5,236,646 | 8/1993 | Cochran et al. | 264/511 |
| 5,256,366 | 10/1993 | Wejrock et al. | 264/101 |

Primary Examiner—Mathieu D. Vargot
Attorney, Agent, or Firm—Pravel, Hewitt, Kimball & Krieger

[57] ABSTRACT

A method for producing advanced composite structures includes the assembly of a number of layers of fibrous reinforcements into a desired configuration. A vacuum is applied to the reinforcement in order to evacuate any air therefrom and to consolidate the plurality of fibrous reinforcements. Resin is introduced to the reinforcement by using a flow path therethrough having entry and exit points. The vacuum is used to transmit the resin through the reinforcement between the entry and exit points. The resin flows into the reinforcement due to the pressure differential between the evacuated reinforcement and the hydrostatic pressure on the resin as well as the capillary effect on the reinforcement.

27 Claims, 6 Drawing Sheets

METHOD FOR FORMING COMPOSITE STRUCTURES

BACKGROUND OF THE INVENTION

1. Field of the Invention

The present invention relates to methods for fabricating composite structures such as composite panels and structural members that include a fabric impregnated with resin. Even more particularly, the present invention relates to an improved method of producing composite components wherein fibrous reinforcements are assembled into a desired configuration and upon a tool. A vacuum is applied to the reinforcements which consolidate the reinforcement and evacuates air therefrom. A resin is applied to the reinforcement by using a flow path therethrough having entry and exit ports. A vacuum is used to transmit the resin through the reinforcement between entry and exit ports. The resin flows into the reinforcement due to the pressure differential between the evacuated reinforcement and the hydrostatic pressure on the resin and also due to the capillary effect of the reinforcement.

2. General Background

Composite fabrication processes can be very expensive because of the labor required to form the laminate in the desired configuration and the need for autoclaves to create the heat and pressure necessary to consolidate and cure the resin and the reinforcement. Additionally, very expensive presses have been used to compress and cure resins and fibrous reinforcement material and to configure those materials into a desired shape in the formation of a composite structure. Advanced composite structures such as are used in the aerospace industry require very particular types of reinforcements and of resins which typically dictate the need for heat and pressure in order to form a "pre-preg" into a consolidated cured laminate. A "pre-preg" is a material which consists of a fibrous reinforcement impregnated with a resin that is partially cured to a state in which it can be handled. The use of pre-preg material is expensive due to specific construction steps involved in making pre-pregs. They typically must be specially packaged, stored, and have a definite shelf life. The use of pre-pregs in the formation of composite structures is known in the art and is generally regarded as an expensive process.

The present invention provides an improved method and apparatus for composite fabrication which dramatically reduces overall costs of composite structures. This cost reduction is achieved without sacrificing mechanical or structural performance. The method and apparatus of the present invention are capable of producing complex aerospace quality components of a wide variety of scale and configuration. Possible applications of this technology include, for example, the space shuttle external tank intertank member, payload fairings for launch vehicles, intertanks for launch systems, ailerons, fairings, spoilers, stabilizers, wing skins for aircraft, sonar transmissible fairings for underwater vessels, radomes, and the like. The present invention provides a method for producing composite components that includes the step of first assembling a number of dry fibrous reinforcements, or preform, into a desired configuration such as by stacking a plurality of fibrous reinforcements onto a forming tool. A vacuum is then applied to the reinforcement in order to evacuate air therefrom and to consolidate the reinforcement.

A resin is applied to the reinforcement by using a flow path therethrough having an entry and an exit point. The vacuum is used to transmit the resin through the reinforcement and between the entry and exit points. The resin flows into the reinforcement due to the pressure differential between the evacuated reinforcement and the hydrostatic pressure on the resin as well as the capillary effect of the reinforcement itself.

The resin can be heated prior to introduction to the reinforcement if desired. This is particularly helpful in dealing with certain exotic resins used in the aerospace industry in which room temperature viscosity inhibits consistent flow. The fibrous reinforcements can be heated prior to and during the introduction of resin to the reinforcement as well.

The reinforcement infiltration process of the present invention provides a means of producing composite components using dry (impregnated) fibrous reinforcements and liquid resin in a non-autoclave process which does not require expensive closed mold tooling or injection machines. The fibrous reinforcements (which can be plies of fabric, mat, or stitched preforms) are first assembled into a desired configuration such as upon a tool or other shaped support.

The resin containment and compaction system is then assembled to the reinforcement and a vacuum applied. During this procedure, the tool, reinforcement and resin can be heated if desired. The heating step lowers the viscosity of the resin and allows the resin to flow more freely through the reinforcement.

The reinforcement is evacuated by using a vacuum source and then the resin is connected to the resin containment and compaction system. The resin is then allowed to flow into the peripheral reinforcement and from that point flows into the reinforcement due to the pressure differential between the evacuated reinforcement and the hydrostatic pressure on the resin as well as the capillary effect of the reinforcement.

The resin is allowed to flow into the reinforcement until the reinforcement is fully impregnated, and any remaining air in the reinforcement is removed during such flow of resin therethrough. Excess resin is vented out of the vacuum attachment in the center portion of the apparatus and then contained in a resin trap. The temperature of the reinforcement is then raised to gel and cure the resin.

The method and apparatus of the present invention has been used to produce laminates with similar quality and performance to traditional autoclave processing. The process can be used to fabricate flat panels as well as complex geometries as well as transitioning a skin/-stringer panel into a metal flange for example.

When compared to hand lay-up/autoclave cure, the present invention has the same versatility to produce the complex geometries, but offers significant reductions in cost. These result from a reduction in material cost by fifty to seventy five percent (50-75%) due to the fact that resin and fiber are used in raw form, as opposed to being combined into a "pre preg" (a pre-impregnated, partially cured sheet material used for hand lay-up). Labor costs are also reduced because parts can be fabricated using woven or stitched preforms. A preform is a type of reinforcement in which the fibers have already been oriented and positioned into its final orientation by automated machinery.

With the method of the present invention, a preform is placed into the mold, compaction is applied, resin is introduced, and the part is cured. With hand lay-up, each ply must be form fitted to the mold and properly oriented individually. Often the plies must be periodically "de-bulked", or compacted with a vacuum bag to reduce bulk, remove entrapped air and allow proper conformance of the pre preg to the tool.

Another advantage of the present invention over hand lay-up is that the method of the present invention does not require an autoclave (an enclosed vessel which applies high pressure and heat for laminate cure). Autoclaves significantly drive up fabrication costs and limit size of parts which can be fabricated. The method of the present invention makes use of ovens or integrally heated tooling, both of which are orders of magnitude less expensive to procure than autoclaves, especially for very large parts.

When compared to traditional resin transfer molding (RTM), the present invention offers much less costly tooling, much larger size capability, higher fiber volumes, and less expensive processing equipment. Resin transfer molding is similar to resin infiltration in that resin is injected into a fibrous preform; however, resin transfer molding requires an expensive closed mold and high pressure resin injection equipment. The closed mold must define all surfaces of the part being fabricated, must maintain close tolerances and fabricated to withstand the high pressures required for resin injection. Such tools are very expensive to produce and maintain. The present invention requires a tool with only one surface; the other surfaces are defined by the conformable compaction system.

The tooling system for the present invention provides great advantages in fabricating parts, including for example, parts with smooth outside surfaces and/or with stiffeners on the inside. For such a part, a tool with a smooth surface could be used with the method of the present invention, and removable mandrels or parasitic tooling could be used to shape the stiffeners.

A resin transfer molding tool for such a part would be very expensive because the exact dimensions and configuration for each stiffener would be required in one half of the tool.

The use of one sided tooling reduces costs of preforms and allows for higher fiber volumes. With traditional resin transfer molding, the preform must be tightly woven to very close tolerances such that it will fit inside a closed space. Because it is very difficult to weave a dense preform to the final dimensions of a part, the percent fiber volume of a given part is limited by the thickness of preform.

With the present invention, the preform is compacted after the conformable compaction system is in place, which allows for higher fiber volume parts. Another advantage of the method of the present invention over resin transfer molding is its size capability. Resin transfer molding is limited first by tooling; large, closed molds tools are prohibitively expensive, especially for any complex geometry. Secondly, resin transfer molding is size limited due to the injection pressures required to impregnate large parts. Large parts may force injection pressures to exceed the capability of available injection equipment or to exceed the pressure required to separate a closed mold.

SUMMARY OF THE PRESENT INVENTION

The present invention provides a method of producing composite components and advanced composite structures. The method of the present invention dramatically reduces overall costs of composite structures. These costs are reduced by more than fifty percent over traditional fabrication methods, without sacrificing mechanical or structural performance. The method of the present invention is capable of producing complex, aerospace quality components of virtually any scale.

The method of the present invention includes a first step of assembling various fibrous reinforcements or plies into a desired configuration to define a laminate. An envelope is formed around the laminate using a tool and preferably a film layer that overlays the tool and the laminate. A vacuum is applied to remove air from the fibrous reinforcements of the laminate.

Resin is introduced to the fibrous reinforcements by using a flow path created by the vacuum source therethrough having entry and exit points.

The vacuum is used to transmit the resin through the reinforcement and between the entry and exit points. As the last step of the method, the resin is allowed to cure.

In the preferred embodiment, the resin is introduced into the reinforcement at the periphery thereof. In the preferred embodiment, the resin flows through the reinforcement due to the combination of pressure differential formed between the evacuated reinforcement and the hydrostatic pressure on the resin as well as the capillary effect of the reinforcement.

In the preferred embodiment, the resin is preliminarily heated prior to the transmission of the resin into the fibrous reinforcements of the laminate.

In the preferred embodiment the resin is heated before introduction into the envelope defined by the tool, the overlaying film layer, and the seal bead at the periphery of the tool.

The method of the present invention is capable of fabricating large structures (for example thirty feet by ten feet by three inches thick), does not require an autoclave, and is capable of producing complex geometries.

The method of the present invention provides a means of producing composite components using dry (unimpregnated) fibrous reinforcements and liquid resin systems in a non-autoclave process which does not require expensive closed mold tooling.

The fibrous reinforcements which form a laminate, can be plies of fabric, mat, or stitched preforms. These reinforcements are assembled upon a tool. A resin containment and compaction system is then assembled onto the reinforcement and tool. The tool, reinforcement and resin are all preferably heated. This step lowers the viscosity of the resin and allows the resin to flow more freely through the reinforcement.

The reinforcement is evacuated by applying a vacuum source to the resin containment and compaction system.

The resin is introduced into the periphery reinforcement. Resin flows into the reinforcement due to the pressure differential between the evacuated reinforcement and the hydrostatic pressure on the resin, as well as the capillary effect of the reinforcement. In the preferred embodiment, atmospheric pressure is sufficient to rapidly impregnate the reinforcement.

The resin is allowed to flow into the reinforcement until the reinforcement is fully impregnated, and any remaining air in the reinforcement is removed. Excess resin is initially vented out the vacuum attachment in the center portion of the apparatus and contained in a resin trap.

The temperature of the reinforcement is raised to gel and cure the resin.

The method of the present invention has been used to produce laminates with similar quality and performance to traditional autoclave processing.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

FIGS. 1-5 show the preferred embodiment of the apparatus of the present invention designated generally by the numeral 10. Resin infiltration apparatus 10 is shown for use in the fabrication of advanced composite structures. The fabrication process of the present invention reduces overall costs of composite structures, without sacrificing mechanical or structural performance. The method of the present invention provides a method for producing complex, aerospace quality components of virtually any scale.

Figure 1:
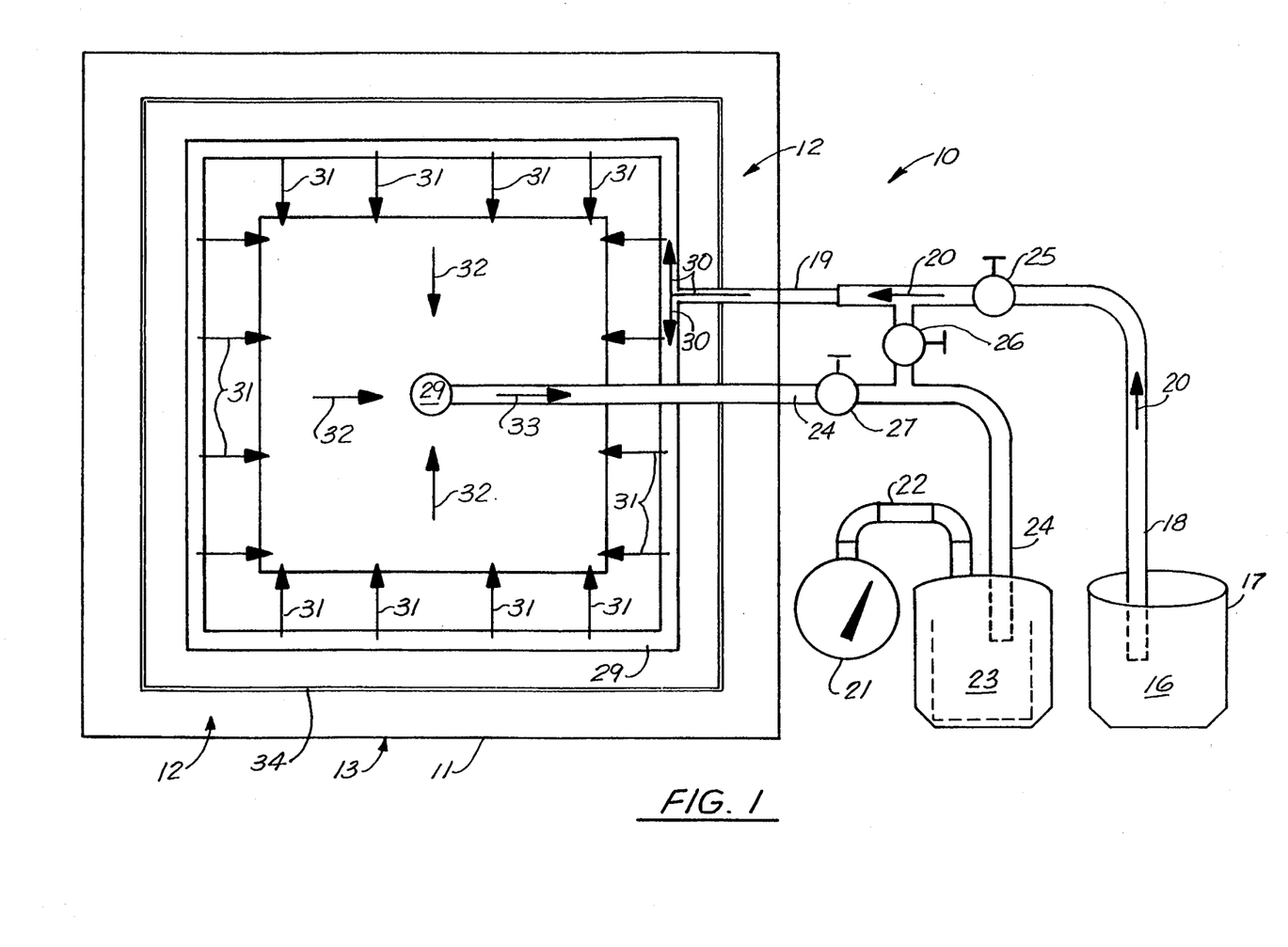
FIG. 1 is a top plan view of the preferred embodiment of the apparatus of the present invention.
Figure 2:
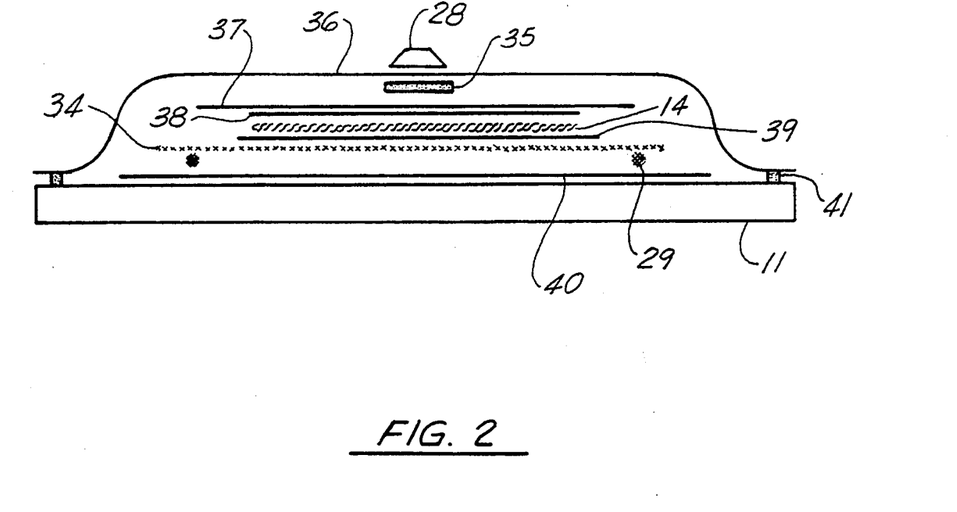
FIG. 2 is a side, schematic view of the preferred embodiment of the apparatus of the present invention.
Figure 3:
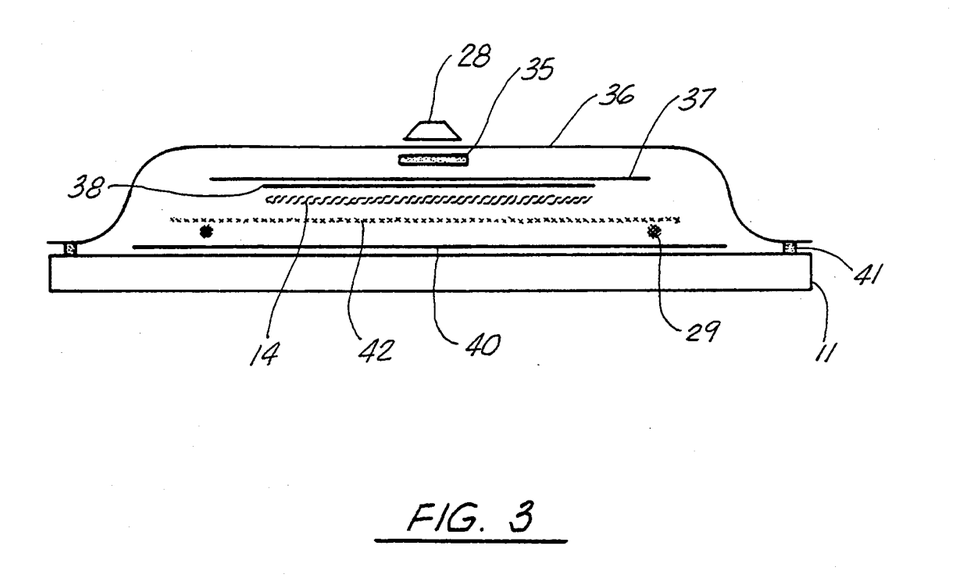
FIG. 3 is a side schematic view of an alternate embodiment of the apparatus of the present invention.

In FIGS. 1-3, resin infiltration apparatus 10 includes a tool or mold 11 that can be flat or complex in geometry. The tool/mold shown in FIGS. 1-3 is a rectangularly shaped structure having an upper surface 12 that is flat. The peripheral edge 13 of tool 11 defines its rectangular or square shape.

Figure 4:
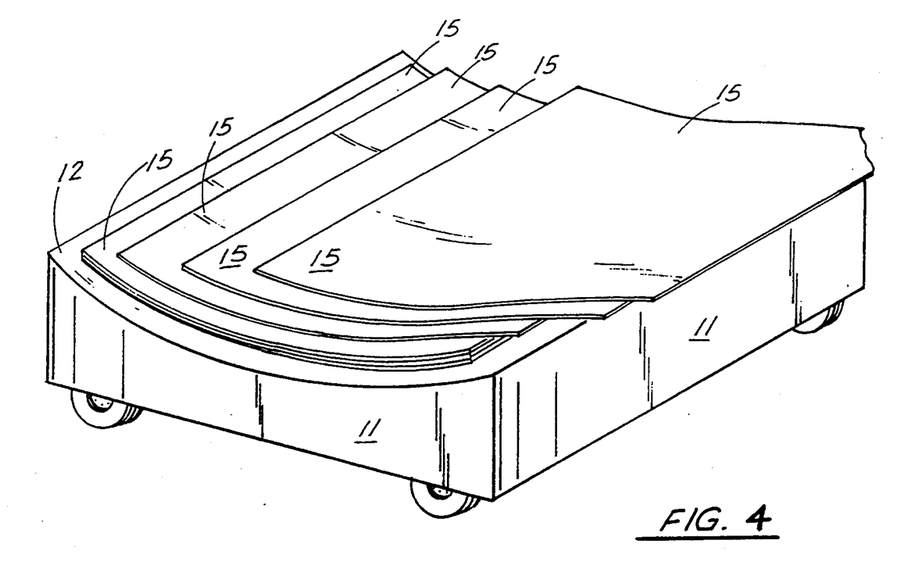
FIG. 4 is a perspective view illustrating the method of the present invention beginning with the stacking of a plurality of fibrous reinforcements.
Figure 5:
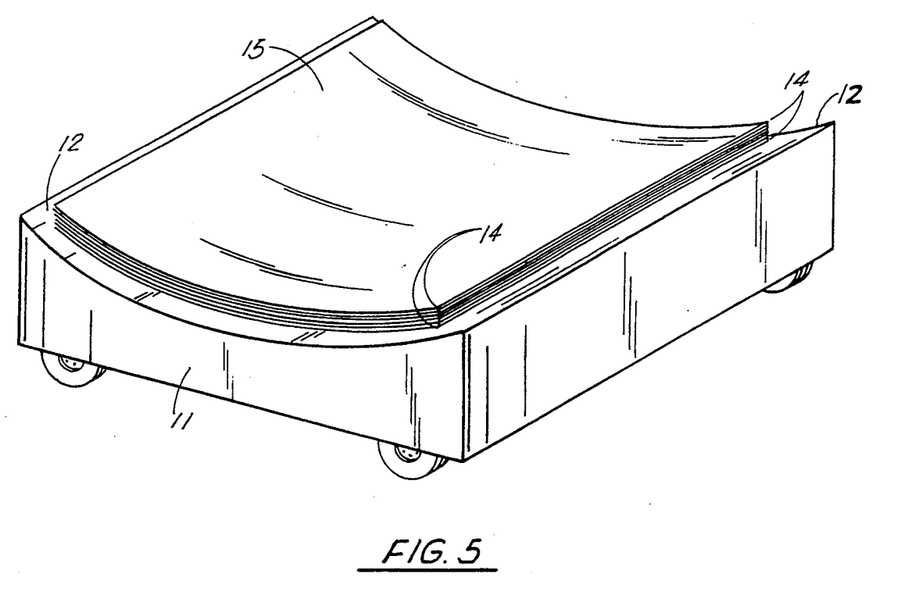
FIG. 5 is a perspective view illustrating the plurality of fibrous reinforcements into a desired orientation.
Figure 6:
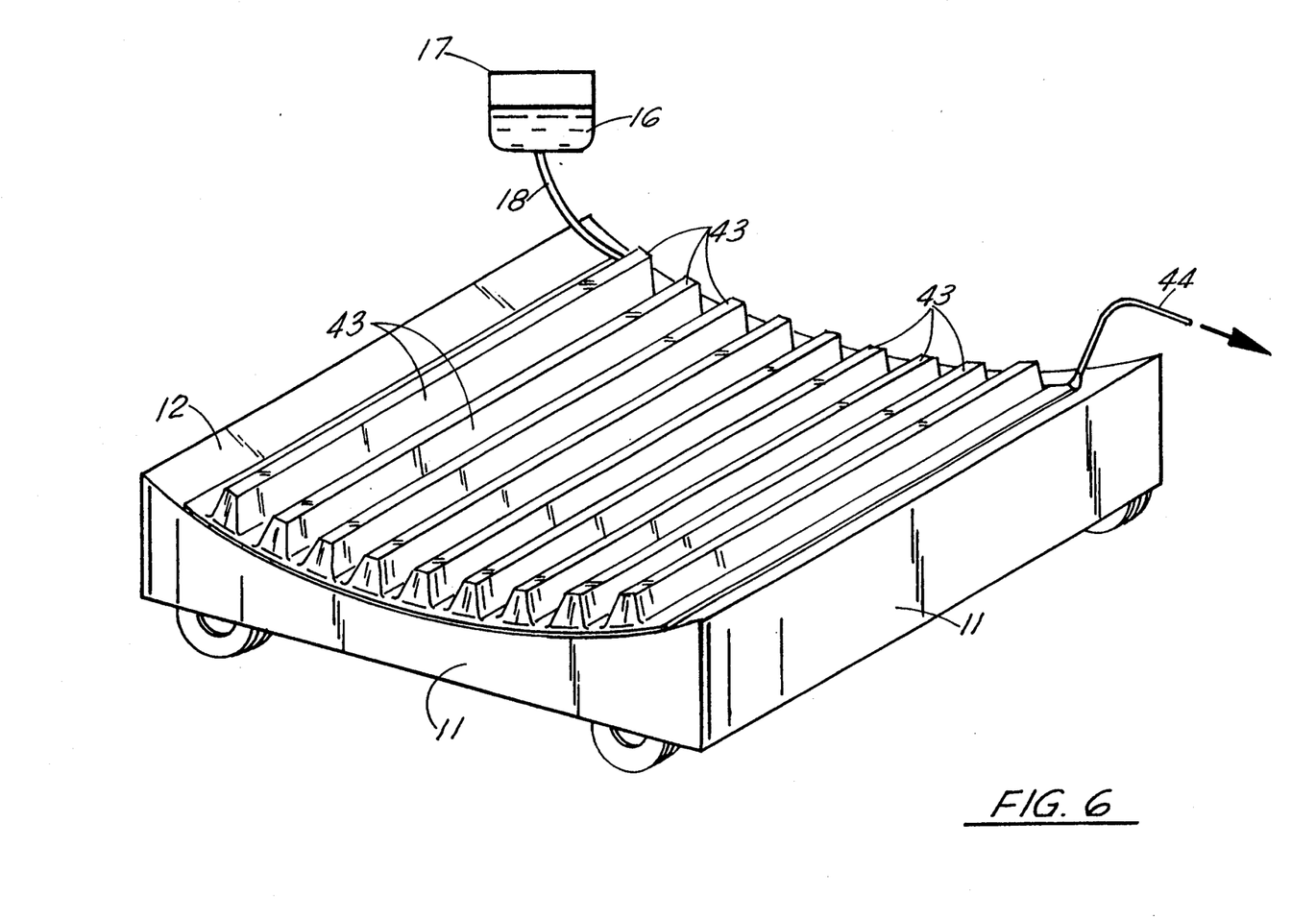
FIG. 6 illustrates a skin/stringer panel configuration during introduction of the resin to the combination of the tool and the fibrous reinforcements.
Figure 7:
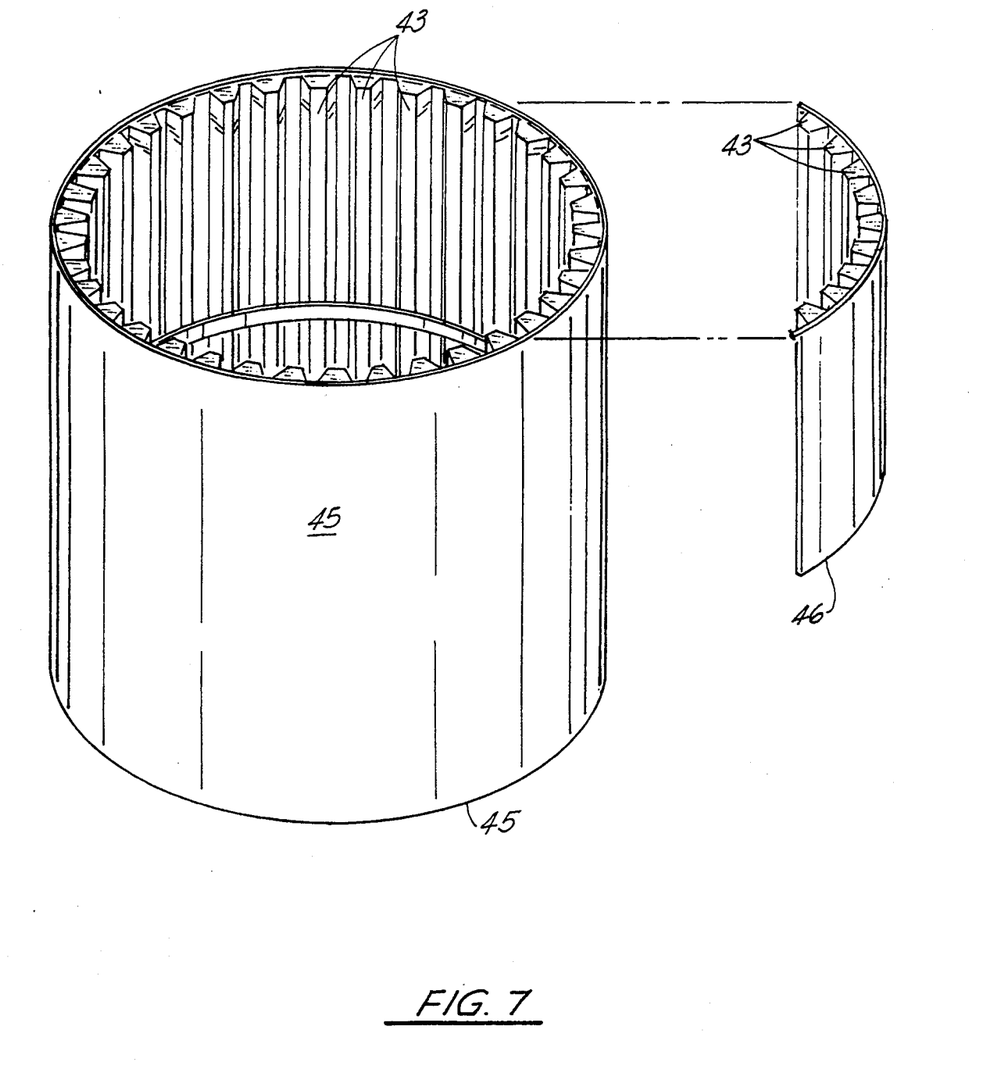
FIG. 7 illustrates an intertank skin/stringer panel made in accordance with the method and apparatus of the present invention.
Figure 8:
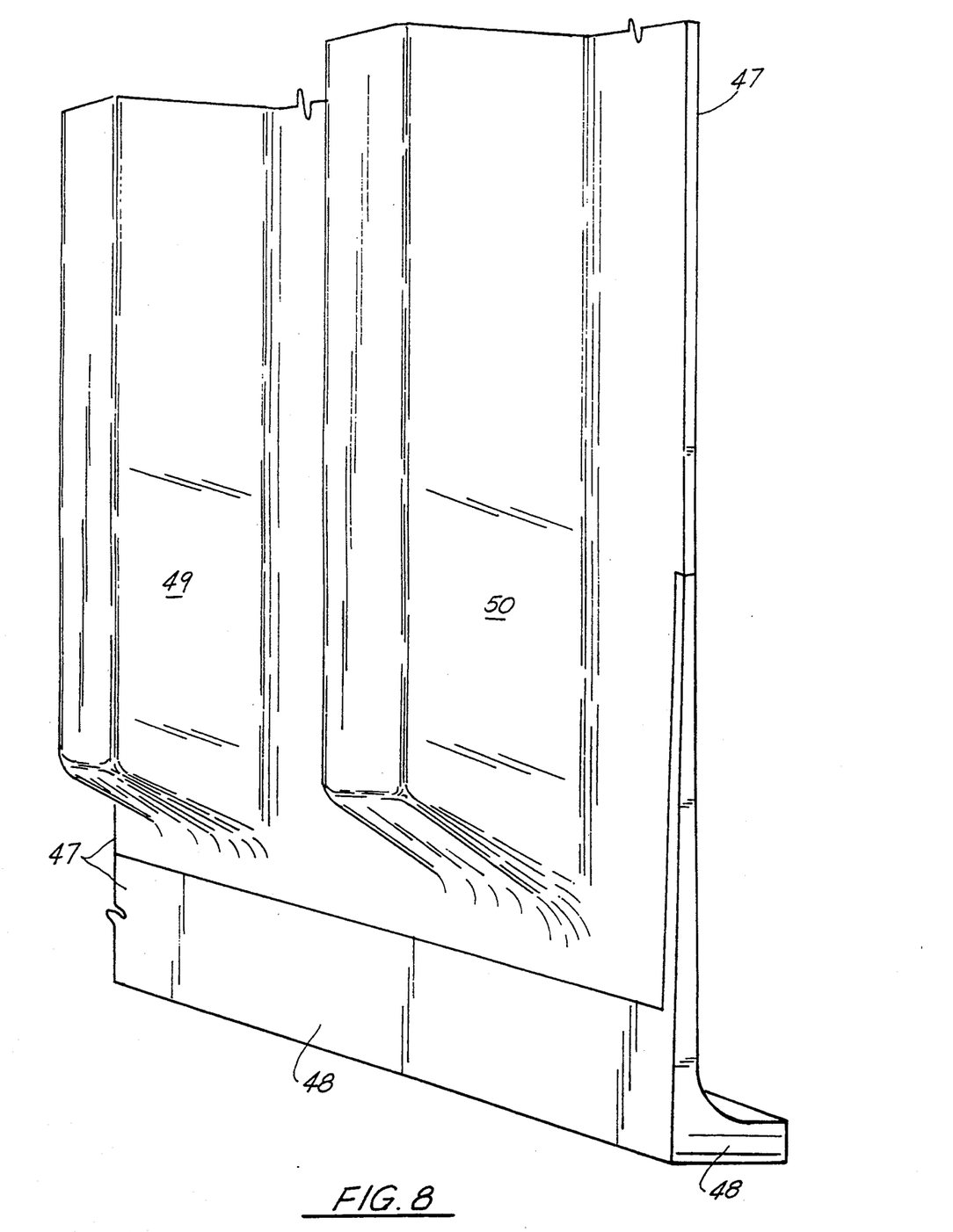
FIG. 8 is a perspective view of an alternate embodiment of the apparatus of the present invention involving the use of a metal flange that is co-cured to a composite panel.

In FIGS. 4-5, the tool 11 is illustrated as having a curved upper surface 12. In FIGS. 1-3, a plurality of plies 15 are placed in stacked arrangement to form a laminate 14. In FIGS. 1-3 the laminate is generally flat. In FIGS. 4-5 the laminate is curved as shown in the drawings. However, it should be understood that the tool upper surface 12 can be of any shape for producing complex components such as the skin/stringer panel shown in FIG. 6.

For the method of the present invention, a plurality of plies 14 are assembled into a desired configuration upon tool 11. The plies are preferably fibrous reinforcements. After the plurality of plies 15 are assembled upon the tool 11 to form laminate 14, a vacuum is applied to the laminate. A resin is then introduced to the laminate 14 using a flow path therethrough having entry and exit points. The vacuum is used to transmit the resin through the laminate 14 and between the entry and exit points. The resin is then allowed to cure. In FIGS. 1-3, a resin supply 16 is shown in the form of a container 17 having resin therein and communicating with flow line 18. Flow line 18 allows resin to flow to resin inlet tube 19 which communicates with resin gate 29. Resin gate 29 can be for example, simply a conduit in the form of a coil spring that extends in a path around the laminate 14 as shown in FIG. 1. The spring rests upon a fabric ply 35 and is covered with a film layer 36 as will be described more fully hereinafter.

Arrows 30 in FIG. 1 indicate the direction of flow of resin from resin inlet tube 19 into resin gate 29. Resin gate 29 has a lumen or internal bore that allows resin to flow through the resin gate 29. Additionally, the resin gate 29 is perforated (such as a coil spring, or perforated tube) so that resin can flow laterally from resin gate 29 and towards laminate 14. Resin can flow from resin gate 29 in the direction of arrows 31 toward laminate 14 by capillary action and by the differential pressure between the evacuated laminate 14 and the hydrostatic pressure on the resin. Resin carrier fabric 34 can be a woven fabric material that allows the resin to flow evenly from the resin gate 29 to the laminate 14. In the preferred configuration, the fabric ply 34 is thinner than the laminate 14 and there remains some distance between the resin gate 29 and the laminate, providing a controlled restriction of resin flow into the laminate.

Arrows 32 in FIG. 1 illustrate the flow of resin from the periphery of laminate 14 toward the center thereof and toward vacuum port 29. Resin exits laminate 14 at vacuum port 29 and enters return flow line 24. The arrow 33 in FIG. 1 illustrates the return flow of resin in line 24 to resin trap 23. Vacuum line 22 pulls a vacuum on resin trap 23 and also on vacuum line 24.

During the infiltration of laminate 14 with resin, valve 25 is open, valve 26 is closed, and valve 24 is open. After the resin has fully infiltrated laminate 14, and flow of resin into line 24 occurs, the system of flow lines, resin gate 29, fabric ply 34, and laminate 14 are complete saturated with resin. At this point, the various valves 25, 26, and 27 are manipulated (by opening, closing, or partially closing) to manage the resin content in the laminate until the resin cures. The laminate is now in the form of a hard composite component panel and can be removed.

FIG. 2 and 3 illustrate a preferred and an alternate embodiment of the infiltration arrangement of the present invention shown in section view.

In FIG. 2, the tool or mold 11 is shown as being covered with a release ply 40. The periphery of the tool or mold 11 has a sealant tape bead 41 that forms a seal between the tool or mold 11 and a film overlay layer 36. Thus, a vacuum is pulled by removing air from the space that is defined by the tool or mold 11, the film layer 36, and the sealant tape 41. Within this envelope, resin gate 29 is placed upon release ply 40.

The resin carrier fabric 34 overlays release ply 40, the resin gate 29 and overlaps the area just externally of the resin gate 29, spaced away from laminate 14 as shown in FIG. 2. A release ply layer 39 can be placed between laminate 14 and fabric ply 34. Another release ply 38 can be placed on the upper most layer of laminate 14 as shown in FIG. 2. An additional film layer 37, namely release film layer 37 can be placed on top of release ply 38.

Release film 37 provides perforations at its center for allowing escaping resin to pass therethrough to resin restriction 35. Resin restriction 35 communicates with an opening in the top of and at the center of film layer 36, and also communicating with vacuum port 28 so that resin can exit the envelope defined by tool 11, sealant tape, bead 41, and film layer 36. In this fashion, as the vacuum evacuates air from the envelope, the resin can escape via vacuum port 28.

In FIG. 3, an alternate embodiment of the lay-up is shown. In the embodiment of FIG. 3, the only difference is that the fabric ply 42 is the first ply of laminate 14. Further, in the embodiment of FIG. 2, there is no release ply 39 placed between the resin carrier fabric and the laminate 14 as with the embodiment of FIG. 2 because the carrier fabric is the first ply of the laminate.

The following table lists the part numbers and part descriptions as used herein and in the drawings attached hereto.

| PARTS LIST | |
| --- | --- |
| Part Number | Description |
| 10 | resin infiltration apparatus |
| 11 | tool/mold |
| 12 | surface |
| 13 | peripheral edge |
| 14 | laminate |
| 15 | ply |
| 16 | resin supply |
| 17 | container |
| 18 | flowline |
| 19 | resin inlet tube |
| 20 | arrow |
| 21 | vacuum |
| 22 | flowline |
| 23 | resin trap |
| 24 | flowline |
| 25 | valve |
| 26 | valve |
| 27 | valve |
| 28 | vacuum port |
| 29 | resin gate |
| 30 | arrows |
| 31 | arrows |
| 32 | arrows |
| 33 | arrow |
| 34 | fabric ply |
| 35 | resin restriction |
| 36 | film layer |
| 37 | release film |
| 38 | release ply |
| 39 | release ply |
| 40 | release ply |
| 41 | sealant tape |
| 42 | fabric ply |
| 43 | stringer |
| 44 | vacuum line |
| 45 | intertank |
| 46 | panel |
| 47 | panel |
| 48 | metal flange |
| 49 | stringer |
| 50 | stringer |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of producing composite components comprising the steps of:
   a) assembling fibrous reinforcements into a desired configuration on a tool body, said reinforcements including a laminate that will define a fiber content, and a resin carrier fabric;
   b) applying a vacuum to the fibrous reinforcements;
   c) introducing resin to the fibrous reinforcements by using a flow path therethrough having entry and exit points the resin carrier fabric comprising in part the entry point;
   d) using the vacuum to transmit the resin through the reinforcement and between the entry and exit points;
   e) allowing the resin cure;
   f) wherein in step "c", the resin carrier fabric defines a resin flow path from the entry to the laminate that controls flow to the laminate.

2. The method of claim 1 wherein the resin is introduced into the reinforcement at an edge portion of the resin carrier fabric and about the periphery thereof.

3. The method of claim 1 wherein flow through the reinforcement is due to the combination of pressure differential between the evacuated reinforcement and the hydrostatic pressure on the resin, and the capillary effect of the reinforcement.

4. The method of claim 1 further comprising the step of heating the resin prior to step "e".

5. The method of claim 1 further comprising the step of restricting resin flow into the laminate prior to step "e".

6. The method of claim 5 wherein resin flow is controlled using one or more valves.

7. The method of claim 1, 5 or 6 wherein a system of valves and tubes allows restriction of resin flow into laminate and/or change of direction of resin flow out of laminate prior to step "e".

8. The method of claim 4 wherein the resin is heated prior to introduction into the reinforcement.

9. The method of claims 1 or 4 further comprising the step of heating the resin and the fibrous reinforcement prior to an introduction of the resin to the reinforcement.

10. The method of claim 1 wherein in step "a" the fibrous reinforcements are assembled upon a tool and covered with at least one layer of flexible material.

11. The method of claim 10 wherein the layer of flexible material is a layer of film.

12. The method of claim 10 wherein the tool body is a solid member.

13. A method of producing composite component product comprising the steps of:
   a) assembling multiple layers of fibrous reinforcements into a desired configuration upon a support tool one of the layers of fibrous reinforcement defining a resin carrier fabric that extends beyond the periphery of the other layers, said other layers defining a laminate portion that controls fiber content of the product;
   b) covering the fibrous reinforcements and tool with a flexible layer to form an envelope that encapsulates the fibrous reinforcements;
   c) applying a vacuum source to the fibrous reinforcements for evacuating air from the envelope;
   d) introducing resin to the envelope and fibrous reinforcements by using a flow path therethrough having entry and exit points;

e) using the vacuum source to transmit the resin through the reinforcement and between the entry and exit points; and f) allowing the resin to cure;

g) wherein in step "e" the resin carrier fabric defines a resin flow path from the entry to the laminate that controls flow to the laminate.

14. The method of claim 13 wherein the resin is introduced into the reinforcement at the periphery thereof.

15. The method of claim 13 wherein resin flow through the reinforcement is due at least in part to the pressure differential across the evacuated reinforcement between the entry and exit points.

16. The method of claim 13 wherein resin flow through the reinforcement is due at least in part to the capillary effect of the reinforcement.

17. The method of claim 1 further comprising the step of heating the resin prior to step "e".

18. The method of claim 4 wherein the resin is heated prior to introduction into the reinforcement.

19. The method of claims 13 or 18 further comprising the step of heating the resin and the fibrous reinforcement prior to an introduction of the resin to the reinforcement.

20. The method of claim 1 wherein in step "a" the fibrous reinforcements and tool are covered with at least one layer of film material to define the envelope.

21. The method of claim 20 wherein the layer of film material is a layer of polymeric film.

22. The method of claim 10 wherein the tool is a solid member.

23. The method of claim 13 wherein the tool has a generally flat surface that carries the fibrous reinforcements.

24. The method of claim 13 wherein the tool has a generally curved surface that carries the fibrous reinforcements.

25. The method of claim 13 wherein the tool has an irregularly shaped surface that carries the fibrous reinforcements.

26. The method of claim 1 further comprising the step of overlaying the laminate with a release film layer having perforations adjacent the exit point and allowing escaping resin to pass therethrough to the exit point.

27. The method of claim 13 further comprising the step of overlaying the laminate with a release film layer having perforations adjacent the exit point and allowing escaping resin to pass therethrough to the exit point.

* * * * *